US011463440B2

(12) United States Patent
Devane et al.

(10) Patent No.: US 11,463,440 B2
(45) Date of Patent: Oct. 4, 2022

(54) CLOUD-BASED SHARED SECURITY CACHE

(71) Applicant: McAfee, LLC, San Jose, CA (US)

(72) Inventors: Oliver G. Devane, Upton (GB); Federico Barbieri, Vizzola P. (IT)

(73) Assignee: McAfee, LLC, San Jose, CA (US)

( * ) Notice: Subject to any disclaimer, the term of this patent is extended or adjusted under 35 U.S.C. 154(b) by 278 days.

(21) Appl. No.: 16/451,325

(22) Filed: Jun. 25, 2019

(65) Prior Publication Data

US 2020/0412725 A1 Dec. 31, 2020

(51) Int. Cl.
*H04L 9/40* (2022.01)

(52) U.S. Cl.
CPC ........... *H04L 63/102* (2013.01); *H04L 63/12* (2013.01); *H04L 63/1433* (2013.01); *H04L 63/168* (2013.01); *H04L 63/20* (2013.01)

(58) Field of Classification Search
CPC .............................. H04L 63/102; H04L 63/12
USPC ........................................................... 726/22
See application file for complete search history.

(56) References Cited

U.S. PATENT DOCUMENTS 9,065,849 B1 6/2015 Rivera et al.
9,990,511 B1 * 6/2018 Dreyfus .................. G06F 21/57
10,686,783 B2 * 6/2020 Rajagopal ............. H04L 63/108
10,735,378 B1 * 8/2020 Bosco ................. H04L 63/0218
2013/0254880 A1 9/2013 Mperovitch et al.
2014/0366144 A1 12/2014 Mperovitch et al.
2016/0269430 A1 * 9/2016 Laswell .............. H04L 63/1416
2018/0091453 A1 * 3/2018 Jakobsson ............... H04L 51/12
2018/0137282 A1 5/2018 Rasanen et al.
2018/0191717 A1 7/2018 Rajagopal et al.
2018/0191838 A1 * 7/2018 Friedman ............. H04M 15/66
2019/0036944 A1 1/2019 Thomas

* cited by examiner

*Primary Examiner* — Anthony D Brown
(74) *Attorney, Agent, or Firm* — Patent Capital Group

(57) ABSTRACT

There is disclosed in one example a computing apparatus, including: a processor and a memory; a network interface; and a security agent including instructions encoded within the memory to instruct the processor to: identify an unknown software object; query, via the network interface, a global reputation store for a global reputation for the unknown software object; receive a response from the global reputation store and determine that the unknown software object does not have a reliable global reputation; compute a local reputation for the unknown software object; and share the local reputation for the unknown software object with the global security cache.

20 Claims, 9 Drawing Sheets

CLIENT DEVICES 110
100
MALICIOUS OBJECT 182
LIGHTING 132
THERMOSTAT 134
72°
150
CLIENT APP 112
LOCAL NETWORK 170
USER 120
SECURITY 136
GATEWAY 108
CLOUD SECURITY PROVIDER 190
104
OTHER DEVICES 140
EXTERNAL NETWORK 172
ATTACKER 180

CLOUD-BASED SHARED SECURITY CACHE

FIELD OF THE SPECIFICATION

This application relates in general to network security, and more particularly, though not exclusively, to a system and method for providing a cloud-based shared security cache.

BACKGROUND

Modern computing ecosystems often include "always on" broadband internet connections. These connections leave computing devices exposed to the internet, and the devices may be vulnerable to attack.

BRIEF DESCRIPTION OF THE DRAWINGS

The present disclosure is best understood from the following detailed description when read with the accompanying FIGURES. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion. Furthermore, the various block diagrams illustrated herein disclose only one illustrative arrangement of logical elements. Those elements may be rearranged in different configurations, and elements shown in one block may, in appropriate circumstances, be moved to a different block or configuration.

SUMMARY

Figure 1:
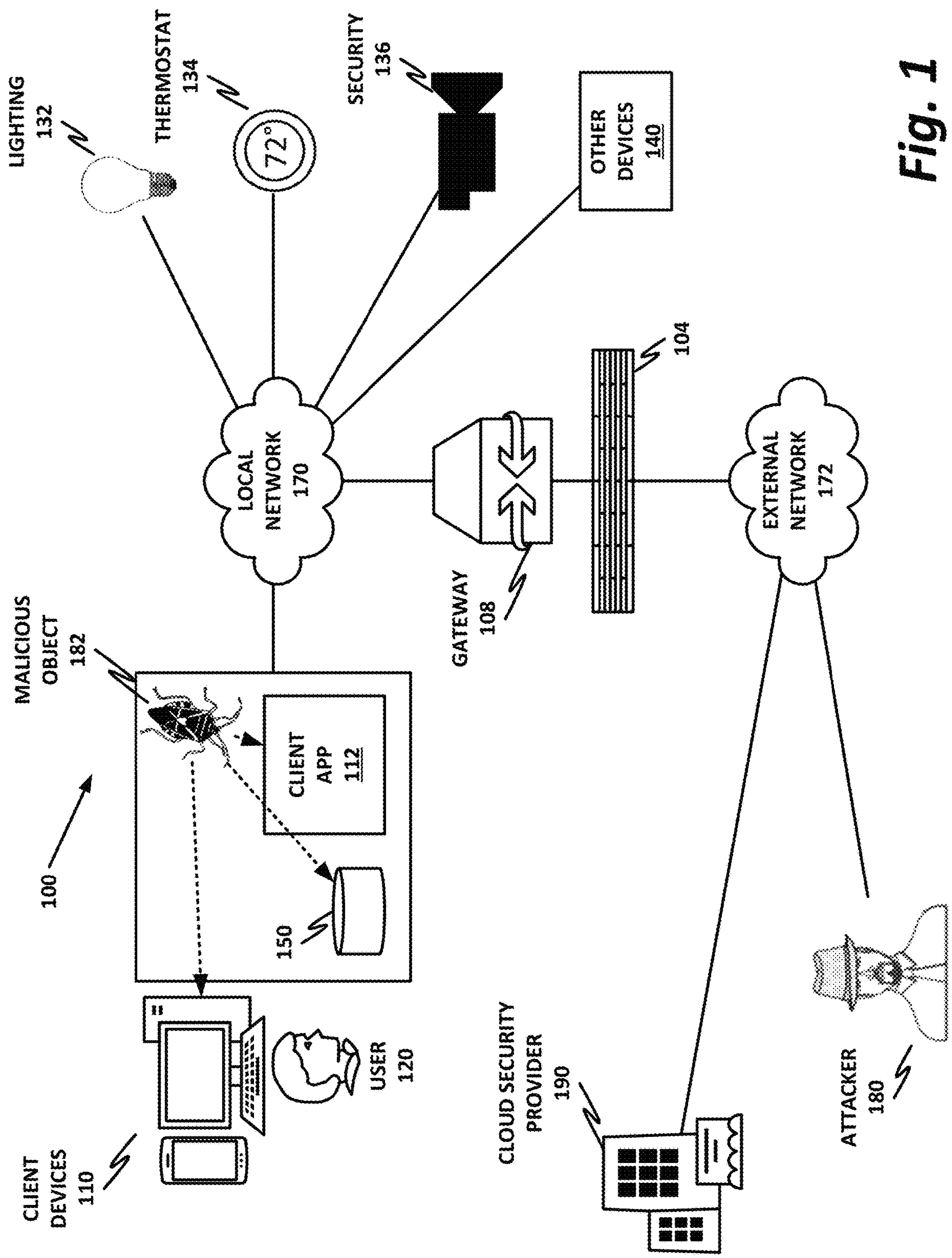
FIG. 1 is a block diagram of selected elements of a security ecosystem.

In an example, there is disclosed a computing apparatus, comprising: a processor and a memory; a network interface; and a security agent comprising instructions encoded within the memory to instruct the processor to: identify an unknown software object; query, via the network interface, a global reputation store for a global reputation for the unknown software object; receive a response from the global reputation store and determine that the unknown software object does not have a reliable global reputation; compute a local reputation for the unknown software object; and share the local reputation for the unknown software object with the global security cache.

EMBODIMENTS OF THE DISCLOSURE

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

The lives of computer users have increasingly gone "digital." In industrialized nations, people do their banking, their communication, their work, their socializing, their dating, and many other things online. In doing so, users and enterprises generate large stores of information that can be valuable to attackers. Information can be sold, misappropriated, used for ransom, or otherwise abused if an attacker can gain access to a computing system that the attacker should not have access to.

This is applicable not only to servers, but even to end user devices. Most users have a vast amount of personal information stored on their laptops, desktops, smartphones, tablets, and other devices. Furthermore, if the user is a member of an enterprise (such as an employee of a corporation), then the user may have—with corporate authorization—important proprietary enterprise information on personal devices. While this enables the user significant convenience in working for the enterprise, it does expose personal and enterprise data to potential attacks.

Because the information stored on computers is so valuable, one challenge faced by security services providers and security researchers is the sheer volume of new and existing attacks that may be encountered at any one time.

This volume of attacks can be compounded by the fact that when an object, such as a binary, text file, script, or other security object is first encountered on a device, it has an unknown reputation. The newly encountered object may be completely benign and may usefully perform its intended function, or it may be a bleeding edge malware attack that exploits known or unknown security apertures in the operating system.

When the endpoint device first encounters an object, a security agent operating on the device may need to make a decision about what to do with the object. The object could be first encountered, for example, in a scheduled hard disk scan, as a download, as an email attachment, on a removable drive, or in some other way. Any of these events can trigger an initial security scan of the object.

If the object is well-known, then the security agent on the client device may simply query a cloud-based reputation cache to determine if the object has a known reputation. This is referred to herein as a "global" security or reputation cache, or a cloud-based cache. The term "global" used here is understood to indicate that the cache has a broader scope than the local host, but does not require that the cache necessarily be worldwide. The global, cloud-based cache could be, for example, worldwide, enterprise, national, or territorial (e.g., city, state, territory, province, etc.) in scope.

Querying may include, for example, querying the cloud-based reputation cache for the name of the object, the size of the object, other metadata associated with the object, or, in some cases, taking a hash of the object and using the hash to ensure that the purported object is indeed an object that has been encountered before.

If the object has already been identified by security researchers operating the cloud-based reputation cache, then the reputation cache may respond to the query with a simple result. In some cases, this is a simple binary yes or no, indicating that either the file should be allowed, or it should be blocked as malicious.

If the global reputation cache does not include a cached reputation for the object, then the local security agent on the endpoint device needs to make a decision about what to do with the object. This could include, for example, quarantining or sandboxing the object until it can be analyzed, denying installation of the object, notifying the end user, notifying an enterprise security administrator, or taking some other security action that may or may not be configured to protect the device from the unknown object.

These security actions often have to rely on a trade-off analysis of convenience for the user on the one hand, and heightened security for the device on the other hand. In the general case, these concerns are at odds with one another. That which increases user convenience in many cases decreases security, and vice versa. For example, an enterprise device may have a strict enforcement policy that denies opening or installation of any binary object that does not have a known good reputation. While this increases device security, it limits the user's flexibility in operating the device. In an enterprise security context, this may be considered a reasonable trade-off. Enterprise devices are generally expected to be used for enterprise purposes, and it is therefore sometimes reasonable to deny users the ability to install unknown, third-party applications and objects on the device.

On the other hand, if the device is a personal device, the user may consider it unreasonable for the operating system to enforce a policy that only objects with known reputations can be installed. In that case, the trade-off leans more toward convenience and less toward security. However, users who demand convenience from their devices are nevertheless unhappy when security is compromised.

A security agent operating on a machine may strike a balance by temporarily limiting access to an unknown object until the object can be analyzed. For example, when an event triggers an object scan (e.g., an event in which the object is first moved to the device from an external source, such as a network drive, a removable device, an email attachment, a download, or some other source), access to the new object may be temporarily stalled while the security agent on the endpoint device scans the newly encountered object. This scanning may include one or more of static analysis, dynamic analysis, runtime analysis, sandboxing, virtualizing, behavioral analysis, analysis by a machine learning algorithm, fuzzy comparison to other known objects with known reputations, heuristic analysis of a user's reaction to or interaction with the object, any combination of the foregoing, or any other security analysis technique. Once the device has been sufficiently analyzed, it may be assigned a temporary reputation, which may be subject to change as other devices encounter the new object, and as security researchers populate a global, cloud-based reputation cache with a reliable reputation for the new object.

In this context, a "reliable" reputation is one that the local host can rely on for security purposes. A reliable reputation may be one that is assigned by a global or enterprise security services provider, and may be considered sufficiently definitive that the local host does not need to perform additional processing or analysis. For example, if a security object is reliably labeled as "good" or "clean," then the local host may install, execute, open, run, or otherwise interact with the object on the assumption that the object is safe. On the other hand, if the object has a reliable "bad" or "unclean" reputation, then the local host can generally assume that the object is unsafe, and can then quarantine, remedy, or take other appropriate security action.

An object may have a "not-reliable" reputation. This could be, for example, a reputation that points in one direction or the other, but the local host cannot ascribe to it sufficient confidence to take final or definitive action. For example, if one other endpoint has scanned a file and found it to be safe (on that endpoint), this may not be definitive proof for the local host that the object is safe. Additional scanning by the local host or other endpoints may be required to increase the local host's faith in the object's reputation. In some cases, a not-reliable reputation is particularly difficult if the reputation is "good" or otherwise "positive." A scan by a single endpoint that finds malware code may be sufficient for the local host to designate the object as bad with sufficient confidence to block it. But the danger of false negatives may be substantial, particularly where a potentially malicious object may deliberately obfuscate its work on some platforms, or in some configurations.

Individual scanning may therefore encounter limitations when an object first appears in the wild. Consider, for example, a system or network of antivirus endpoints that scan files in isolation. When an object is newly encountered, a reputation, which could for example include prevalence, may be checked to see if the file should be convicted (e.g., marked as malicious or suspicious) or marked as clean. In some cases, when these individual antivirus endpoints encounter a new device, no scan cache is shared outside of the local environment. So if, for example, the same file is first encountered on 30 million different web service security (WSS) endpoints, that single file is scanned 30 million times. Multiplying this by thousands or tens of thousands of new files that may be encountered for the first time in the wild on any given day, a file may be scanned billions of times by millions of machines before it is ever assigned a global reputation in the global reputation or cloud-based reputation cache. This results in duplicated scanning, and wasteful use of energy and other resources that are expended on scanning the newly encountered file.

It may, therefore, be preferable in some embodiments to use a cloud-based cache as a global caching service for file scans. For example, MCAFEE, LLC currently operates the global threat intelligence (GTI™) database that includes a cache of globally recognized reputations for known objects. Such cloud-based caches may be populated by security researchers who encounter new objects in the wild, analyze them, and assign them reputations.

However, when a file is first encountered on an endpoint, the endpoint itself may perform some security analysis on the newly encountered object. Once the endpoint has computed this reputation, rather than simply keeping the reputation to itself, the endpoint device can upload metadata about the analysis to the cloud-based caching service. For example, the endpoint may take a hash of the newly encountered file, and upload the hash, along with metadata about the file, and information about the analysis itself to the cloud-based reputation service. Later, if the same object appears on another endpoint, then the endpoint may query the cloud cache service to gain information about the file.

The fact that a single endpoint has analyzed a particular object and assigned it a reputation is not necessarily dispositive of the object's reputation on a different endpoint. The weight that the new endpoint gives to the existing reputation may depend on a number of factors. For example, the weighting may be influenced by the prevalence of the file, the type of analysis done (e.g., static versus behavioral), the number of endpoints that have analyzed the file, the trustworthiness of the endpoints that have analyzed the file, the time since the object was last encountered, the complexity of the object, and any other factors that may be relevant to weighting the reputation provided.

For example, if even a single machine performs a static analysis on an object and finds code sequences that are used in known malware, this may weigh heavily in favor of any other machine encountering the object marking it as malicious. On the other hand, if 10 or 100 machines have encountered a new object and analyzed it behaviorally, and none of those machines have encountered behavioral issues with the object, this is not necessarily persuasive that the object is benign. Some species of malware are deliberately configured to attack only a certain percentage of machines, or machines with a specific configuration. Thus, if 100 machines have encountered the object without a problem, the 101st may nevertheless have an issue. This is particularly true if the first 100 machines are highly homogeneous (e.g., if they belong to a common enterprise and are similarly configured). On the other hand, if 30,000 highly heterogeneous machines have encountered the object and none of them have encountered issues in behavioral analysis, this is more persuasive that the object is benign.

Thus, a reputation returned by a cloud-based caching service may be a multi-dimensional reputation, or a value that tracks across several different dimensions of metadata. Without necessarily performing a detailed scan on its own, a local machine may be able to use this multi-dimensional metadata to assign a useful reputation to an object, even if only temporarily. For example, even if the cloud cache cannot return a highly confident "1" or "good" reputation for the object, it may return an array of metadata that the local device can use to quickly infer a sufficiently high reputation for the object that the user is permitted to interact with the object, or is perhaps permitted to interact with the object with the warning that the object does not yet have a known good reputation. On the other hand, even if the object does not have a high confidence "0" or "bad" reputation, the array of metadata returned may be sufficient for the endpoint to determine that the object is questionable enough that access to it should be blocked, or at least that it should be analyzed in a virtual machine, sandbox, or other safe method to ensure that it does not have adverse effects on the system.

If an object has an unknown reputation, it may be monitored with behavioral scanning technology. Once a result from this further scanning is calculated (e.g., the result may be malicious, clean, or unknown, by way of nonlimiting example), this result can also be uploaded to the cloud cache to aid the next machine encountering the object.

If the returned reputation is "clean" or "dirty," behavioral scanning may not necessarily be required. If the behavioral scanning itself returns an unknown result, the object may be scanned again with behavioral scanners on other endpoints. As these endpoints upload the results to the cloud cache, a more refined reputation may be derived for the object, and higher confidence may be assigned to that reputation by other endpoints.

As described in this specification, using a cloud cache as a worldwide or global caching service may help to improve performance of all endpoints globally, because the endpoints do not necessarily need to analyze an object in detail before assigning a reputation. Furthermore, this enables security agents operating on local devices to perform more aggressive scans on truly unknown objects or files, because these objects or files will only be scanned once, or a handful of times. In other words, if an "unknown" reputation really means that the object has not received a certified reputation from a detailed security analysis by a dedicated security team, even though the object may have been encountered thousands, tens of thousands, or millions of times, then it may not be reasonable for the first million endpoint devices that encounter the object to perform a detailed scan on the object.

On the other hand, if an "unknown" reputation means that the object is truly unknown—that this endpoint is truly the first or one of the first endpoints to ever encounter the file—then this situation may be deemed sufficiently rare as to warrant detailed scanning and analysis of that file on the endpoint. This provides advantages over some existing architectures, in which a local cache only benefits the local machine. The global reputation cache of the present specification improves performance on all endpoints that are connected to the global reputation cache.

A system and method for providing a cloud-based shared security cache will now be described with more particular reference to the attached FIGURES. It should be noted that throughout the FIGURES, certain reference numerals may be repeated to indicate that a particular device or block is referenced multiple times across several FIGURES. In other cases, similar elements may be given new numbers in different FIGURES. Neither of these practices is intended to require a particular relationship between the various embodiments disclosed. In certain examples, a genus or class of elements may be referred to by a reference numeral ("widget 10"), while individual species or examples of the element may be referred to by a hyphenated numeral ("first specific widget 10-1" and "second specific widget 10-2").

FIG. 1 is a block diagram of a security ecosystem 100. Embodiments of security ecosystem 100 may be configured or adapted to provide a cloud-based shared security cache as disclosed in the present specification.

In the example of FIG. 1, security ecosystem 100 may be an enterprise, a government entity, a data center, a telecommunications provider, a "smart home" with computers, smart phones, and various Internet of things (IoT) devices, or any other suitable ecosystem. Security ecosystem 100 is provided herein as an illustrative and nonlimiting example of a system that may employ, and benefit from, the teachings of the present specification.

Within security ecosystem 100, one or more users 120 operate one or more client devices 110. A single user 120 and single client device 110 are illustrated here for simplicity, but a home or enterprise may have multiple users, each of which may have multiple devices, such as desktop computers, laptop computers, smart phones, tablets, hybrids, or similar.

Client devices 110 may be communicatively coupled to one another and to other network resources via local network 170. Local network 170 may be any suitable network or combination of one or more networks operating on one or more suitable networking protocols, including a local area network, a home network, an intranet, a virtual network, a wide area network, a wireless network, a cellular network, or the internet (optionally accessed via a proxy, virtual machine, or other similar security mechanism) by way of nonlimiting example. Local network 170 may also include one or more servers, firewalls, routers, switches, security appliances, antivirus servers, or other network devices, which may be single-purpose appliances, virtual machines, containers, or functions. Some functions may be provided on client devices 110.

In this illustration, local network 170 is shown as a single network for simplicity, but in some embodiments, local network 170 may include any number of networks, such as one or more intranets connected to the internet. Local network 170 may also provide access to an external network, such as the internet, via external network 172. External network 172 may similarly be any suitable type of network.

Local network 170 may connect to the internet via gateway 108, which may be responsible, among other things, for providing a logical boundary between home network 172 and external network 170. Local network 170 may also provide services such as dynamic host configuration protocol (DHCP), gateway services, router services, and switching services, and may act as a security portal across local boundary 104.

Local network 170 may also include a number of discrete IoT devices. For example, local network 170 may include IoT functionality to control lighting 132, thermostats or other environmental controls 134, a security system 136, and any number of other devices 140. Other devices 140 may include, as illustrative and nonlimiting examples, network attached storage (NAS), computers, printers, smart televisions, smart refrigerators, smart vacuum cleaners and other appliances, and network connected vehicles.

Local network 170 may communicate across local boundary 104 with external network 172. Local boundary 104 may represent a physical, logical, or other boundary. External network 172 may include, for example, websites, servers, network protocols, and other network-based services. In one example, an attacker 180 (or other similar malicious or negligent actor) also connects to external network 172. A cloud security provider 190 may provide services to local network 170, such as security software, security updates, network appliances, or similar. For example, MCAFEE, LLC provides a comprehensive suite of security services that may be used to protect local network 170 and the various devices connected to it.

In one illustrative example, attacker 180 manages to insert malicious object 182 into client device 110 through one of several known methods. When client device 110 first encounters malicious object 182, the object may not have a known reputation. Thus, client device 110 may query cloud security provider 190 to determine whether there is a globally cached reputation for malicious object 182.

If client device 110 is the first, or one of the first, endpoint devices to encounter malicious object 182, cloud security provider 190 may not have a reliable reputation, yet, for malicious object 182. In that case, cloud device 110 may perform some local analysis of malicious object 182 to determine whether or not it is malicious. As described above, this analysis may take several forms, such as static analysis, dynamic analysis, behavior analysis, or other analysis. The selection of which analysis to perform, and how detailed that analysis will be, may depend on an enterprise security policy, or on user preferences provided by user 120. A security agent on client device 110 may perform the appropriate analysis, and then decide to take a security action in relation to malicious object 182. If the analysis determines with sufficient confidence that the object is not malicious, then the object may be permitted to run or to perform its normal function.

However, if client device 110 operating a security agent determines that malicious object 182 is malicious, then other security action may be taken, such as quarantining, sandboxing, blocking, or otherwise protecting client device 110 from malicious object 182.

In some cases, malicious object 182 may not yet have a reliable global reputation assigned by cloud security provider 190. However, other endpoint devices may have already encountered malicious object 182, and performed some analysis on it. In that case, these other endpoint devices may have cached their analysis results with cloud security provider 190. If cloud security provider 190 does not have a reliable reputation for malicious object 182, it may nevertheless have a vector of metadata associated with analyses performed on malicious object 182 by other endpoint devices. In that case, cloud security provider 190 may provide to client device 110 the cached reputation vector, which client device 110 may then use to determine what local trust to assign malicious object 182. If one or more endpoints have performed a detailed static analysis on malicious object 182, and deemed malicious object 182 to be malicious according to that static analysis, then client device 110 may determine that malicious object 182 is most likely malicious and should therefore not be trusted. This is true because a number of devices running the same security agent and providing the same static analysis algorithm are likely to arrive at the same conclusion from the static analysis. However, one factor in a metadata vector that may be provided for malicious object 182 may include different algorithms that are performed by different client devices. Client device 110 may trust some algorithms more than other algorithms, and thus, if a preferred algorithm has not been run on malicious object 182, a security agent of client device 110 may perform its own static analysis of malicious object 182 to provide a more reliable or more trustworthy result.

If no behavioral analysis is provided for malicious object 182, then client device 110 may perform a behavior analysis on malicious object 182 to observe its behavior. Note that behavior analysis may require more results from more different endpoints to be reliable. Because some malware inadvertently or deliberately targets devices with different characteristics, a positive behavioral analysis by one client device does not necessarily imply that another client device will have a similarly positive experience with the unknown object. Thus, client device 110 may analyze an array of metadata to determine how many devices have performed the behavioral analysis, and what the characteristics of those devices are. This may enable client device 110 to assign a trustworthiness to a cached reputation, or cached reputation data, provided by cloud security provider 190.

It may be a goal of users 120 to successfully operate devices on local network 170 without interference from attacker 180. In one example, attacker 180 is a malware author whose goal or purpose is to cause malicious harm or mischief, for example, by injecting malicious object 182 into client device 110. Once malicious object 182 gains access to client device 110, it may try to perform work such as social engineering of user 120, a hardware-based attack on client device 110, modifying storage 150 (or volatile memory), modifying client application 112 (which may be running in memory), or gaining access to local resources. Furthermore, attacks may be directed at IoT objects. IoT objects can introduce new security challenges, as they may be highly heterogeneous, and in some cases may be designed with minimal or no security considerations. To the extent that these devices have security, it may be added on as an afterthought. Thus, IoT devices may in some cases represent new attack vectors for attacker 180 to leverage against local network 170.

Malicious harm or mischief may take the form of installing root kits or other malware on client devices 110 to tamper with the system, installing spyware or adware to collect personal and commercial data, defacing websites, operating a botnet such as a spam server, or simply to annoy and harass users 120. Thus, one aim of attacker 180 may be to install his malware on one or more client devices 110 or any of the IoT devices described. As used throughout this specification, malicious software ("malware") includes any object configured to provide unwanted results or do unwanted work. In many cases, malware objects will be executable objects, including, by way of nonlimiting examples, viruses, Trojans, zombies, rootkits, backdoors, worms, spyware, adware, ransomware, dialers, payloads, malicious browser helper objects, tracking cookies, loggers, or similar objects designed to take a potentially-unwanted action, including, by way of nonlimiting example, data destruction, data denial, covert data collection, browser hijacking, network proxy or redirection, covert tracking, data logging, keylogging, excessive or deliberate barriers to removal, contact harvesting, and unauthorized self-propagation. In some cases, malware could also include negligently-developed software that causes such results even without specific intent.

In enterprise contexts, attacker 180 may also want to commit industrial or other espionage, such as stealing classified or proprietary data, stealing identities, or gaining unauthorized access to enterprise resources. Thus, attacker 180's strategy may also include trying to gain physical access to one or more client devices 110 and operating them without authorization, so that an effective security policy may also include provisions for preventing such access.

In another example, a software developer may not explicitly have malicious intent, but may develop software that poses a security risk. For example, a well-known and often-exploited security flaw is the so-called buffer overrun, in which a malicious user is able to enter an overlong string into an input form and thus gain the ability to execute arbitrary instructions or operate with elevated privileges on a computing device. Buffer overruns may be the result, for example, of poor input validation or use of insecure libraries, and in many cases arise in nonobvious contexts. Thus, although not malicious, a developer contributing software to an application repository or programming an IoT device may inadvertently provide attack vectors for attacker 180. Poorly-written applications may also cause inherent problems, such as crashes, data loss, or other undesirable behavior. Because such software may be desirable itself, it may be beneficial for developers to occasionally provide updates or patches that repair vulnerabilities as they become known. However, from a security perspective, these updates and patches are essentially new objects that must themselves be validated.

Local network 170 may contract with or subscribe to a cloud security provider 190, which may provide security services, updates, antivirus definitions, patches, products, and services. MCAFEE, LLC is a nonlimiting example of such a security services provider that offers comprehensive security and antivirus solutions. In some cases, cloud security provider 190 may include a threat intelligence capability such as the global threat intelligence (GTI™) database provided by MCAFEE, LLC, or similar competing products. Cloud security provider 190 may update its threat intelligence database by analyzing new candidate malicious objects as they appear on client networks and characterizing them as malicious or benign.

Other security considerations within security ecosystem 100 may include parents' or employers' desire to protect children or employees from undesirable content, such as pornography, adware, spyware, age-inappropriate content, advocacy for certain political, religious, or social movements, or forums for discussing illegal or dangerous activities, by way of nonlimiting example.

Figure 2:
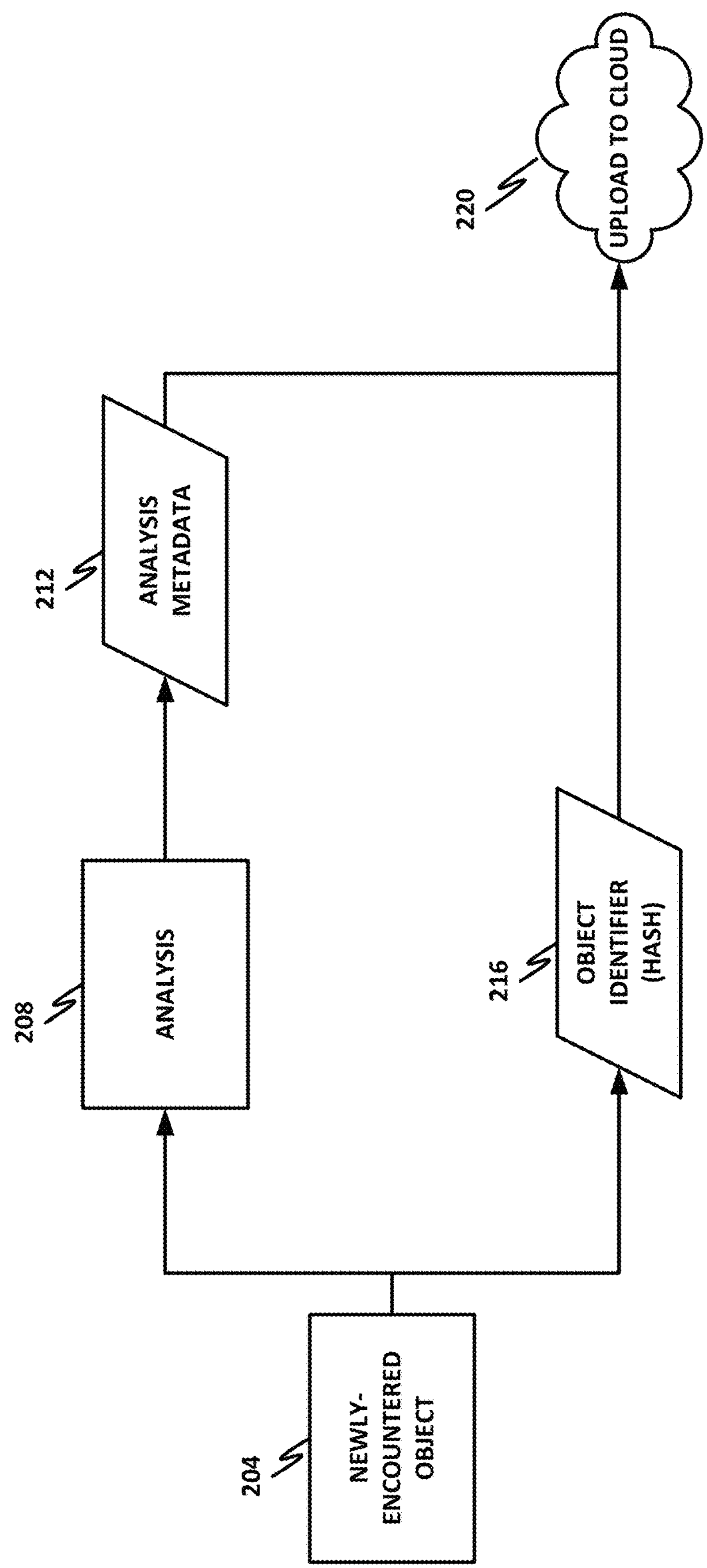
FIG. 2 is a block diagram illustrating operations that may be performed on a newly encountered object.

FIG. 2 is a block diagram illustrating operations that may be performed on a newly encountered object 204. The block diagram of FIG. 2 assumes that the newly encountered object is one that does not have a cached reputation, or, if there is cached metadata and/or a reputation from analysis by endpoints, the reputation may not be sufficiently reliable for the present endpoint device to trust the reputation.

A security agent running on the endpoint may examine newly encountered object 204, and upon determining that it does not have a sufficiently reliable cached reputation, the security agent may assign to the object an object identifier. The object identifier may be, for example, a hash computed according to a hash algorithm such as SHA-256, MD5, or any other hash algorithm. Furthermore, the object identifier need not necessarily be a hash. It could be a fuzzy hash, a metadata identifier (such as file name, file size, or file modification date), a combination of metadata, or some other identifier that is assigned to the newly encountered object. The object identifier of block 216 need not uniquely identify the object, but in some embodiments is sufficiently unique to avoid a large number of collisions.

For example, a hash is not truly unique to the hashed object. In some cases, the hash itself is much smaller than the object, and although it is statistically unlikely to get the same hash from hashing two different objects, it is not impossible. Furthermore, two or more objects could have the same name, file size, date stamp, or other data that identify the objects.

In block 208, the newly encountered object is subject to analysis, which yields analysis metadata 212. Once an object identifier 216 has been assigned to newly encountered object 204, and analysis metadata are available for newly encountered object 204, object identifier 216 and analysis metadata 212 may be uploaded to cloud 220. This provides a global cache of the results of the local analysis. This global cache can be updated in a crowd-sourced fashion by many different endpoints, and as more endpoints perform analysis, the reliability of the cached reputation may increase.

Figure 3:
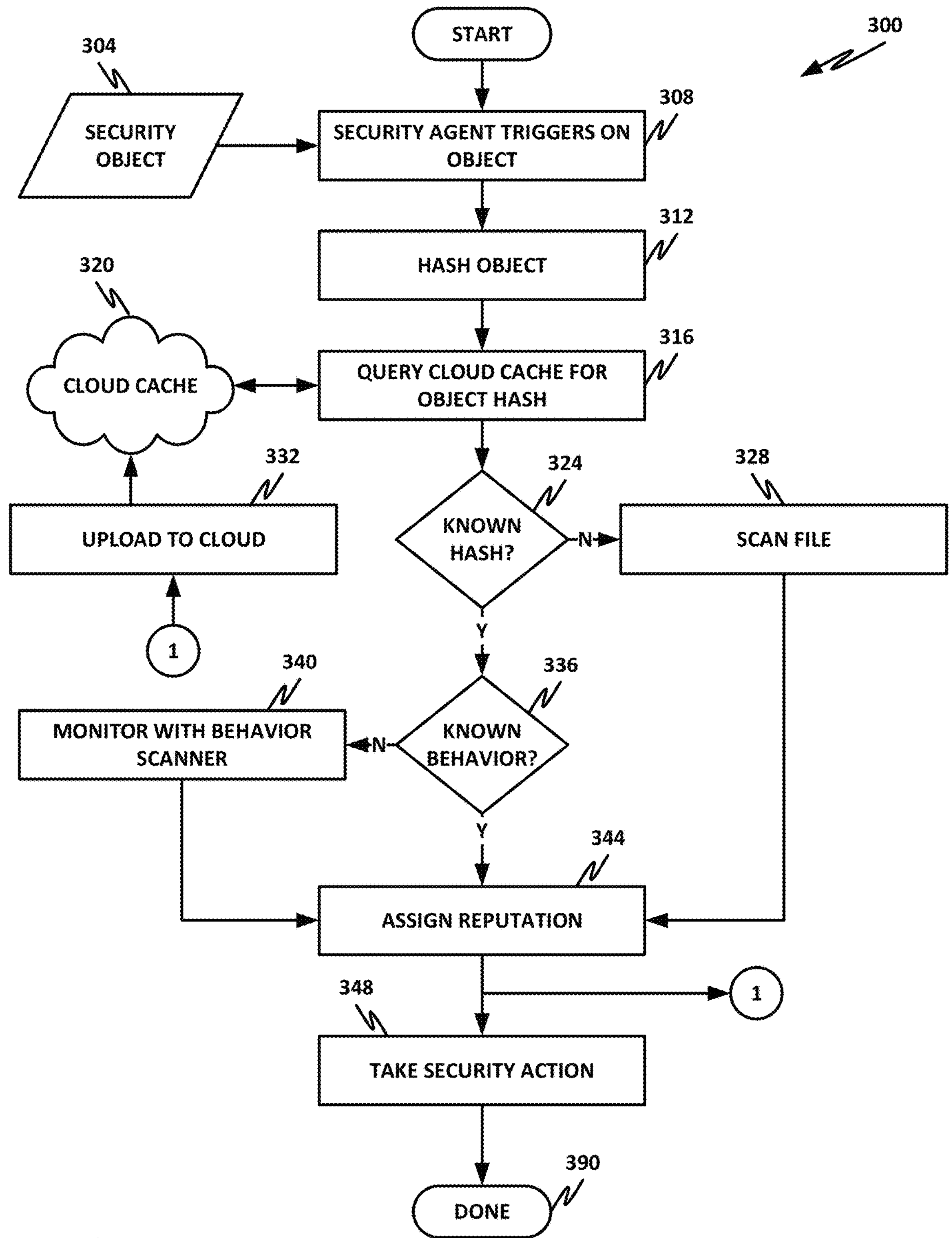
FIG. 3 is a block diagram of a method of performing an object analysis on a newly encountered object.

FIG. 3 is a block diagram of a method 300 of performing an object analysis on a newly encountered object.

Starting in block 308, a newly identified security object is encountered, and a security agent running on the endpoint triggers on the object. This triggering could occur when the object first is saved to the local endpoint device, such as when the object is saved from an email, transferred wirelessly, transferred from a removable storage, downloaded from the internet, copied from a network drive, or otherwise first transferred locally to the endpoint device. This triggering could also occur during a user initiated or regularly scheduled hard disk scan, in which the security agent scans the entire hard disk for unknown objects.

In block 312, the security agent assigns an object identifier to security object 304, such as by hashing security object 304.

In block 316, the security agent uses the hash to query a cloud cache 320 for a match of the object hash, or other object identifier. Cloud cache 320 may return either with a reliable reputation (e.g., one provided formally by security researchers at a security services provider), with cached, cloud-sourced reputation data and metadata from other endpoints, or with a completely unknown reputation as the case may be.

In decision block 324, the security agent determines whether cloud cache 320 identified the object as having a known hash or object identifier.

If the hash or object identifier is unknown to cloud cache 320, then in block 328, the security agent may scan the object or file using any analysis pattern, such as static analysis, behavioral analysis, dynamic analysis, sandboxing, virtualizing, or other analysis. Based on the results of this scanning operation, in block 344, the security agent assigns the object a reputation.

Once the security agent has assigned the object a reputation, then following on-page connector 1, in block 332, the reputation (along with metadata for the reputation and the object) may be uploaded to cloud cache 320.

In block 348, based for example on the results of the object scan, the security agent may take a security action. If the scan and analysis determine that the object is most likely benign, then the object may be permitted to run. Other examples of security actions include, by way of illustrative and nonlimiting example, asking for user verification, warning the user, sandboxing the object, virtualizing the object, quarantining the object, blocking the object, notifying the user, notifying an enterprise security administrator, or otherwise taking an action appropriate with the reputation on the local endpoint.

Returning to decision block 324, if cloud cache 320 returns a known reputation for the object, then the local security agent may still need to take additional action to determine the reliability or trustworthiness of the reputation. For example, in decision block 336, the security agent may determine, based on the returned reputation and/or metadata, whether the object will exhibit known behavior, or whether the behavior of the object is unknown.

For example, if the object has been submitted to detailed static analysis that has revealed known code sequences that are used in known malware, or that otherwise match known malware, then it may be determined that the object will act in a malicious manner on the local endpoint. On the other hand, if the object has been subjected to some analysis, but the analysis is incomplete, then the object may have unknown behavior.

If the object has unknown behavior, then in block 340, the local security agent may monitor the device with a behavior scanner to further refine the behavioral model associated with the unknown object.

In block 344, the security agent assigns the object a reputation, either based on behavior scanning in block 340, or because in block 336 the security agent determined that the cached reputation was sufficient to assign the object a known behavior.

Following on-page connector 1, in block 332, the security agent uploads the reputation computed in block 344 to cloud cache 320. It should be noted that some logic may be applied when updating the cloud cache to authenticate and ensure the detection is valid.

In block 348, the security agent on the local endpoint takes some security action as described above. The security action may be selected to be consistent with the reputation, either returned by cloud cache 320, or computed by the security agent on the endpoint device.

In block 390, the method is done.

Figure 4:
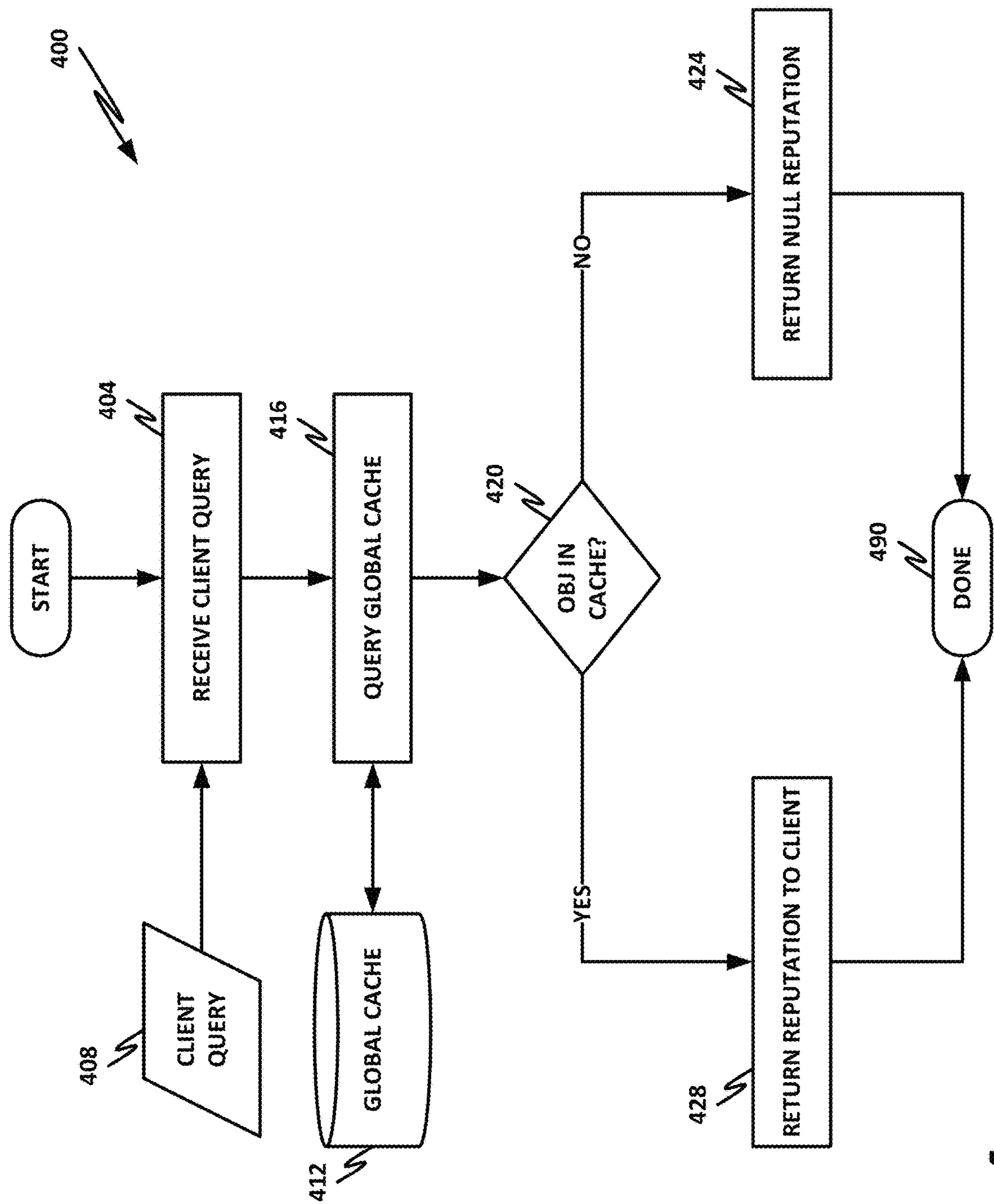
FIG. 4 is a flowchart of a method that may be performed by a cloud server.

FIG. 4 is a flowchart of a method 400 that may be performed by a cloud server. The cloud server may have a reputation caching engine, which may operate on the hardware of the cloud server.

Starting in block 404, the server receives a client query 408 from a client or endpoint device.

In block 416, after receiving the client query 408, the reputation caching engine of the server device queries a global cache 412 to determine whether the object has a known reputation, or cached global analysis by endpoint devices.

In decision block 420, the reputation caching engine determines whether the object has data in cache. This could include either a reliable reputation assigned by a security services provider, or it could include cached analysis reputations and metadata provided by security agents on endpoint devices.

In block 428, if the object has a known reputation, or if the object has cached reputation analyses, then the reputation data are returned to the client device.

In block 424, if the object was not found in cache, then the reputation caching engine may return a "no reputation" signal to the endpoint device. In block 490, the method is done.

Figure 5:
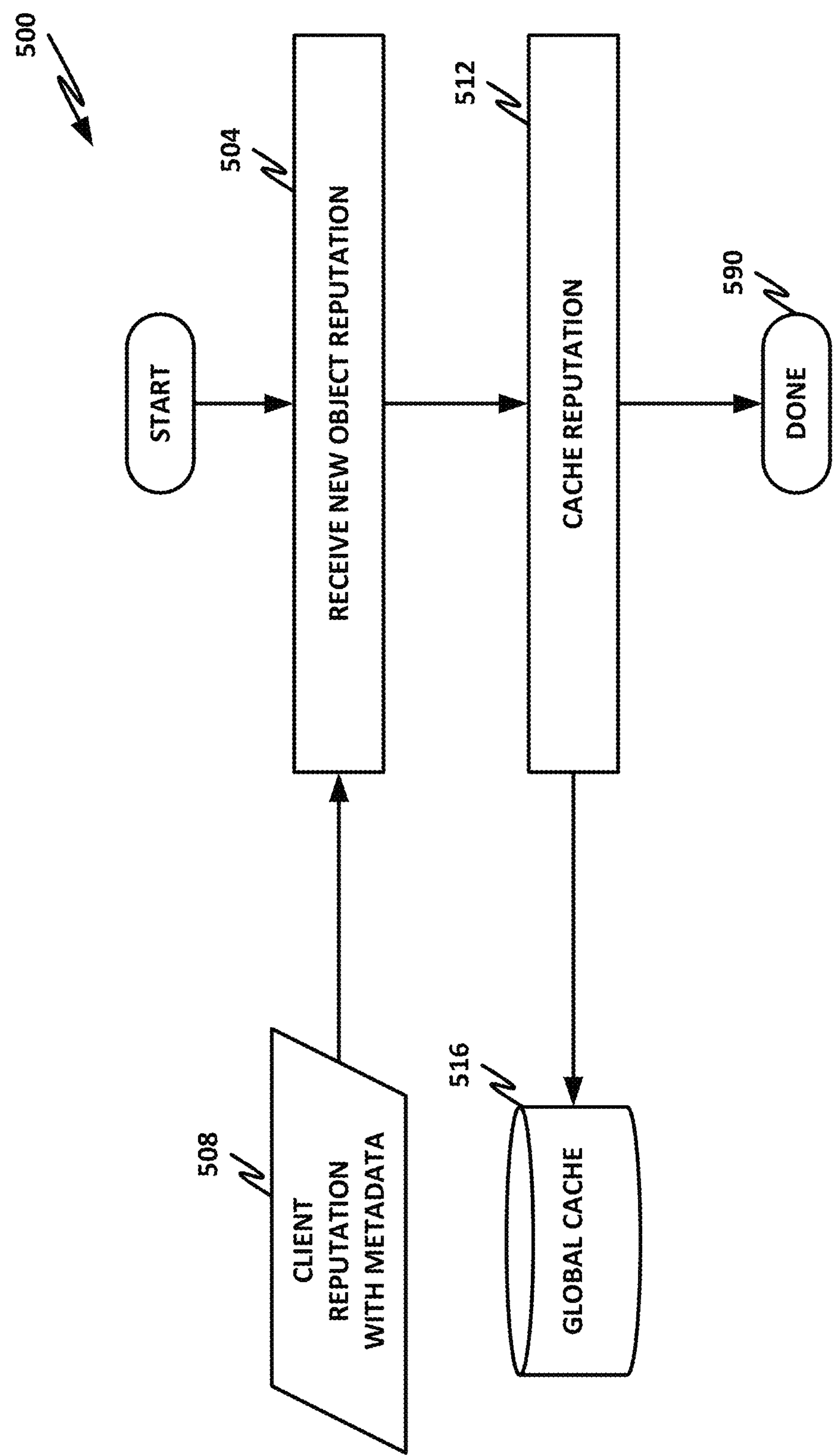
FIG. 5 is a flowchart of a method that may be performed by a reputation caching engine of a cloud reputation server.

FIG. 5 is a flowchart of a method 500 that may be performed by a reputation caching engine of a cloud reputation server. The method 500 may be performed by the same engine as that which performs method 400, or it may be performed by a different engine. In some cases, the different functions could be provided on completely separate machines, while in other cases, they could be performed by the same binary program on the same device. In general, the distribution of functions may be provided according to the requirements of a particular embodiment.

Starting in block 504, the reputation caching engine receives incoming client reputation with metadata from a security agent on a client or endpoint device. The reputation may include the results of the analysis performed by the client device, and may also include metadata about the object, the device, or other telemetry provided by the client device.

The telemetry could include, by way of illustrative and nonlimiting example, the type of analysis performed, performance characteristics of the machine performing the analysis, the hardware and software configuration of the device, the time to perform the analysis, compute resources consumed in performing the analysis, or any other telemetry metadata that may be useful in scoring or understanding the analysis.

In block 512, the reputation caching engine caches the reputation to global cache 516. Once the reputation is in global cache 516 it may be returned in a new iteration to a different endpoint or client device that encounters the same or a similar object the next time.

In block 590, the method is done.

Figure 6:
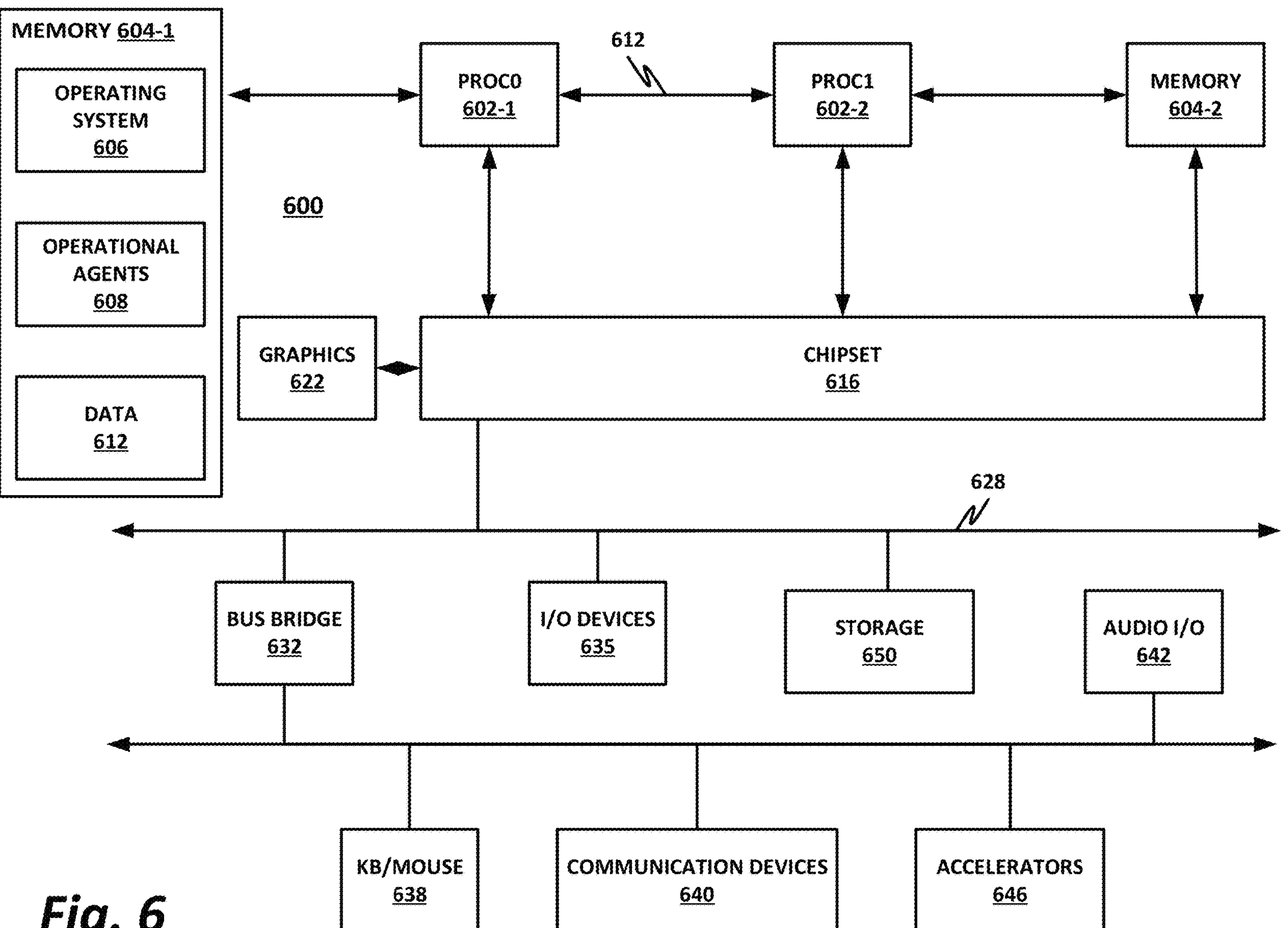
FIG. 6 is a block diagram of selected elements of a hardware platform.

FIG. 6 is a block diagram of a hardware platform 600. Embodiments of hardware platform 600 may be configured or adapted to provide a cloud-based shared security cache as disclosed in the present specification.

Although a particular configuration is illustrated here, there are many different configurations of hardware platforms, and this embodiment is intended to represent the class of hardware platforms that can provide a computing device. Furthermore, the designation of this embodiment as a "hardware platform" is not intended to require that all embodiments provide all elements in hardware. Some of the elements disclosed herein may be provided, in various embodiments, as hardware, software, firmware, microcode, microcode instructions, hardware instructions, hardware or software accelerators, or similar. Furthermore, in some embodiments, entire computing devices or platforms may be virtualized, on a single device, or in a data center where virtualization may span one or a plurality of devices. For example, in a "rackscale architecture" design, disaggregated computing resources may be virtualized into a single instance of a virtual device. In that case, all of the disaggregated resources that are used to build the virtual device may be considered part of hardware platform 600, even though they may be scattered across a data center, or even located in different data centers.

Hardware platform 600 is configured to provide a computing device. In various embodiments, a "computing device" may be or comprise, by way of nonlimiting example, a computer, workstation, server, mainframe, virtual machine (whether emulated or on a "bare metal" hypervisor), network appliance, container, IoT device, high performance computing (HPC) environment, a data center, a communications service provider infrastructure (e.g., one or more portions of an Evolved Packet Core), an in-memory computing environment, a computing system of a vehicle (e.g., an automobile or airplane), an industrial control system, embedded computer, embedded controller, embedded sensor, personal digital assistant, laptop computer, cellular telephone, Internet protocol telephone, smart phone, tablet computer, convertible tablet computer, computing appliance, receiver, wearable computer, handheld calculator, or any other electronic, microelectronic, or microelectromechanical device for processing and communicating data. At least some of the methods and systems disclosed in this specification may be embodied by or carried out on a computing device.

In the illustrated example, hardware platform 600 is arranged in a point-to-point (PtP) configuration. This PtP configuration is popular for personal computer (PC) and server-type devices, although it is not so limited, and any other bus type may be used.

Hardware platform 600 is an example of a platform that may be used to implement embodiments of the teachings of this specification. For example, instructions could be stored in storage 650. Instructions could also be transmitted to the hardware platform in an ethereal form, such as via network interface 648, or retrieved from another source via any suitable interconnect. Once received (from any source), the instructions may be loaded into memory 604, and may then be executed by one or more processor 602 to provide elements such as an operating system 606, operational agents 608, or data 612.

Figure 8:
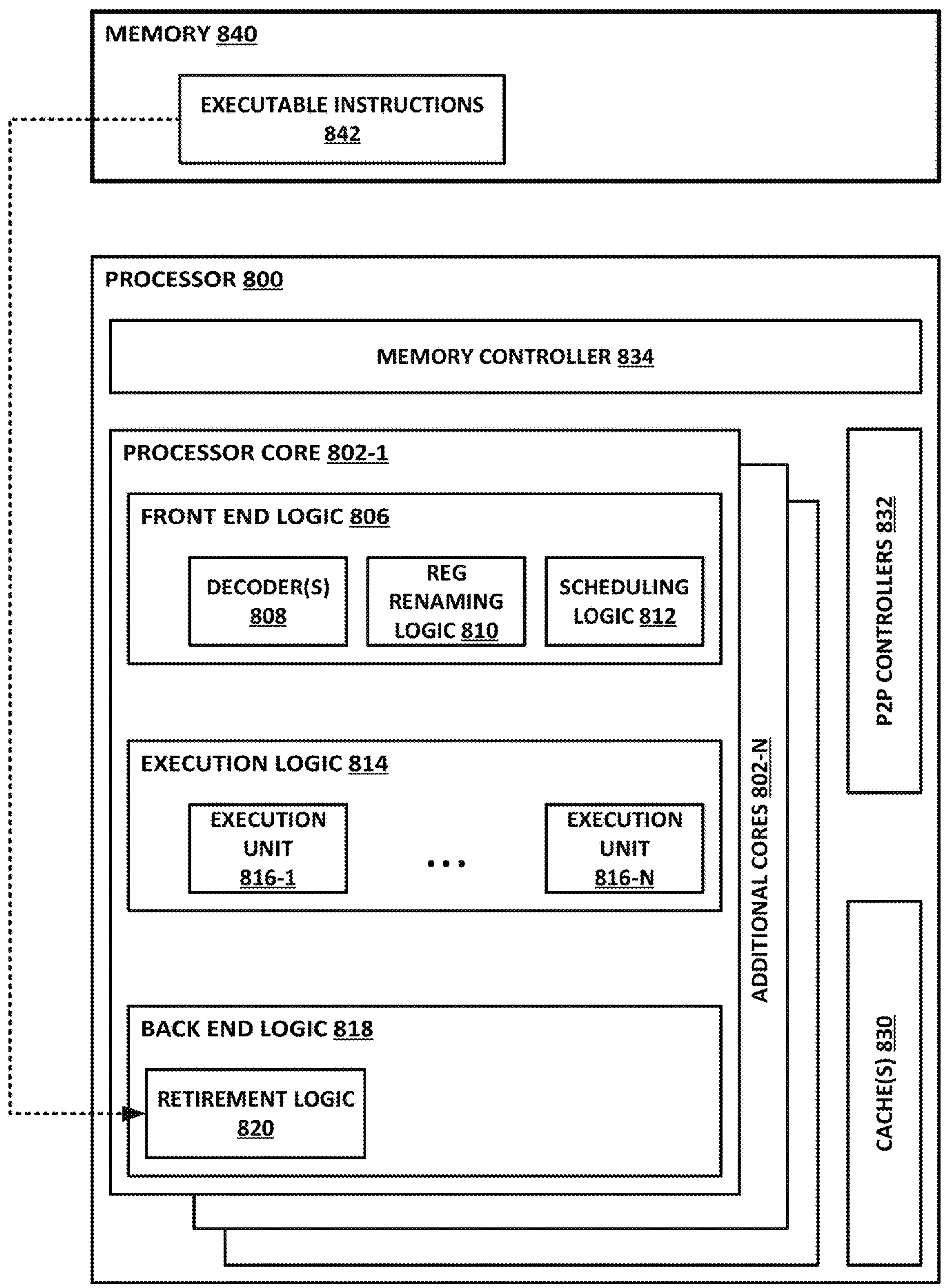
FIG. 8 is a block diagram of selected elements of a processor.

Hardware platform 600 may include several processors 602. For simplicity and clarity, only processors PROC0 602-1 and PROC1 602-2 are shown. Additional processors (such as 2, 4, 8, 16, 24, 32, 64, or 128 processors) may be provided as necessary, while in other embodiments, only one processor may be provided. Details of processors 602 are not illustrated in this FIGURE, but one embodiment is illustrated in FIG. 8. Processors may have any number of cores, such as 1, 2, 4, 8, 16, 24, 32, 64, or 128 cores.

Processors 602 may be any type of processor and may communicatively couple to chipset 616 via, for example, PtP interfaces. Chipset 616 may also exchange data with other elements, such as a high performance graphics adapter 622. In alternative embodiments, any or all of the PtP links illustrated in FIG. 6 could be implemented as any type of bus, or other configuration rather than a PtP link. In various embodiments, chipset 616 may reside on the same die or package as a central processor unit (CPU) 912 or on one or more different dies or packages. Each chipset may support any suitable number of CPUs 602. A chipset 616 (which may be a chipset, uncore, Northbridge, Southbridge, or other suitable logic and circuitry) may also include one or more controllers to couple other components to one or more CPUs.

Two memories, 604-1 and 604-2 are shown, connected to PROC0 602-1 and PROC1 602-2, respectively. As an example, each processor is shown connected to its memory in a direct memory access (DMA) configuration, though other memory architectures are possible, including ones in which memory 604 communicates with processor 610 via a bus. For example, some memories may be connected via a system bus, or in a data center, memory may be accessible in a remote DMA (RDMA) configuration.

Memory 604 may include any form of volatile or nonvolatile memory including, without limitation, magnetic media (e.g., one or more tape drives), optical media, flash, random access memory (RAM), double data rate RAM (DDR RAM) nonvolatile RAM (NVRAM), static RAM (SRAM), dynamic RAM (DRAM), persistent RAM (PRAM), data-centric (DC) persistent memory (e.g., Intel® Optane/3D-crosspoint), cache, Layer 1 (L1) or Layer 2 (L2) memory, on-chip memory, registers, virtual memory region, read-only memory (ROM), flash memory, removable media, tape drive, cloud storage, or any other suitable local or remote memory component or components. Memory 604 may be used for short, medium, and/or long-term storage. Memory 604 may store any suitable data or information utilized by platform logic. In some embodiments, memory 604 may also comprise storage for instructions that may be executed by the cores of CPUs 602 or other processing elements (e.g., logic resident on chipsets 616) to provide functionality.

In certain embodiments, memory 604 may comprise a relatively low-latency volatile main memory, while storage 650 may comprise a relatively higher-latency nonvolatile memory. However, memory 604 and storage 650 need not be physically separate devices, and in some examples may represent simply a logical separation of function (if there is any separation at all). It should also be noted that although DMA is disclosed by way of nonlimiting example, DMA is not the only protocol consistent with this specification, and that other memory architectures are available.

Certain computing devices provide main memory 604 and storage 650, for example, in a single physical memory device, and in other cases, memory 604 and/or storage 650 are functionally distributed across many physical devices. In the case of virtual machines or hypervisors, all or part of a function may be provided in the form of software or firmware running over a virtualization layer to provide the logical function, and resources such as memory, storage, and accelerators may be disaggregated (i.e., located in different physical locations across a data center). In other examples, a device such as a network interface may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, hardware instructions, microcode, programmable logic, or objects that can coordinate to achieve a logical operation.

Graphics adapter 622 may be configured to provide a human-readable visual output, such as a command-line interface (CLI) or graphical desktop such as Microsoft Windows, Apple OSX desktop, or a Unix/Linux X Window System-based desktop. Graphics adapter 622 may provide output in any suitable format, such as a coaxial output, composite video, component video, video graphics array (VGA), or digital outputs such as digital visual interface (DVI), FPDLink, DisplayPort, or high definition multimedia interface (HDMI), by way of nonlimiting example. In some examples, graphics adapter 622 may include a hardware graphics card, which may have its own memory and its own graphics processing unit (GPU).

Chipset 616 may be in communication with a bus 628 via an interface circuit. Bus 628 may have one or more devices that communicate over it, such as a bus bridge 632, I/O devices 635, network interface 648, accelerators 646, communication devices 640, and a keyboard and/or mouse 638, by way of nonlimiting example. In general terms, the elements of hardware platform 600 may be coupled together in any suitable manner. For example, a bus may couple any of the components together. A bus may include any known interconnect, such as a multi-drop bus, a mesh interconnect, a fabric, a ring interconnect, a round-robin protocol, a PtP interconnect, a serial interconnect, a parallel bus, a coherent (e.g., cache coherent) bus, a layered protocol architecture, a differential bus, or a Gunning transceiver logic (GTL) bus, by way of illustrative and nonlimiting example.

Communication devices 640 can broadly include any communication not covered by network interface 648 and the various I/O devices described herein. This may include, for example, various universal serial bus (USB), FireWire, Lightning, or other serial or parallel devices that provide communications.

I/O Devices 635 may be configured to interface with any auxiliary device that connects to hardware platform 600 but that is not necessarily a part of the core architecture of hardware platform 600. A peripheral may be operable to provide extended functionality to hardware platform 600, and may or may not be wholly dependent on hardware platform 600. In some cases, a peripheral may be a computing device in its own right. Peripherals may include input and output devices such as displays, terminals, printers, keyboards, mice, modems, data ports (e.g., serial, parallel, USB, Firewire, or similar), network controllers, optical media, external storage, sensors, transducers, actuators, controllers, data acquisition buses, cameras, microphones, speakers, or external storage, by way of nonlimiting example.

In one example, audio I/O 642 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth, or Wi-Fi audio, by way of nonlimiting example. Audio input may also be provided via similar interfaces, in an analog or digital form.

Bus bridge 632 may be in communication with other devices such as a keyboard/mouse 638 (or other input devices such as a touch screen, trackball, etc.), communication devices 640 (such as modems, network interface devices, peripheral interfaces such as PCI or PCIe, or other types of communication devices that may communicate through a network), audio I/O devices 642, a data storage device 644, and/or accelerators 646. In alternative embodiments, any portions of the bus architectures could be implemented with one or more PtP links.

Operating system 606 may be, for example, Microsoft Windows, Linux, UNIX, Mac OS X, iOS, MS-DOS, or an embedded or real-time operating system (including embedded or real-time flavors of the foregoing). In some embodiments, a hardware platform 600 may function as a host platform for one or more guest systems that invoke application (e.g., operational agents 608).

Operational agents 608 may include one or more computing engines that may include one or more non-transitory computer-readable mediums having stored thereon executable instructions operable to instruct a processor to provide operational functions. At an appropriate time, such as upon booting hardware platform 600 or upon a command from operating system 606 or a user or security administrator, processor 602 may retrieve a copy of the operational agent (or software portions thereof) from storage 650 and load it into memory 604. Processor 610 may then iteratively execute the instructions of operational agents 608 to provide the desired methods or functions.

As used throughout this specification, an "engine" includes any combination of one or more logic elements, of similar or dissimilar species, operable for and configured to perform one or more methods provided by the engine. In some cases, the engine may be or include a special integrated circuit designed to carry out a method or a part thereof, a field-programmable gate array (FPGA) programmed to provide a function, a special hardware or microcode instruction, other programmable logic, and/or software instructions operable to instruct a processor to perform the method. In some cases, the engine may run as a "daemon" process, background process, terminate-and-stay-resident program, a service, system extension, control panel, bootup procedure, basic in/output system (BIOS) subroutine, or any similar program that operates with or without direct user interaction. In certain embodiments, some engines may run with elevated privileges in a "driver space" associated with ring 0, 1, or 2 in a protection ring architecture. The engine may also include other hardware, software, and/or data, including configuration files, registry entries, application programming interfaces (APIs), and interactive or user-mode software by way of nonlimiting example.

Where elements of an engine are embodied in software, computer program instructions may be implemented in programming languages, such as an object code, an assembly language, or a high-level language such as OpenCL, FORTRAN, C, C++, JAVA, or HTML. These may be used with any compatible operating systems or operating environments. Hardware elements may be designed manually, or with a hardware description language such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

Network interface 648 may be provided to communicatively couple hardware platform 600 to a wired or wireless network or fabric. A "network," as used throughout this specification, may include any communicative platform operable to exchange data or information within or between computing devices, including, by way of nonlimiting example, a local network, a switching fabric, an ad-hoc local network, Ethernet (e.g., as defined by the IEEE 802.3 standard), Fibre Channel, InfiniBand, Wi-Fi, or other suitable standard. Intel® Omni-Path™ Architecture (OPA), TrueScale™, Ultra Path Interconnect (UPI) (formerly called QPI or KTI), FibreChannel, Ethernet, FibreChannel over Ethernet (FCoE), InfiniBand, PCI, PCIe, fiber optics, millimeter wave guide, an internet architecture, a packet data network (PDN) offering a communications interface or exchange between any two nodes in a system, a local area network (LAN), metropolitan area network (MAN), wide area network (WAN), wireless local area network (WLAN), virtual private network (VPN), intranet, plain old telephone system (POTS), or any other appropriate architecture or system that facilitates communications in a network or telephonic environment, either with or without human interaction or intervention. Network interface 648 may include one or more physical ports that may couple to a cable (e.g., an Ethernet cable, other cable, or waveguide).

In some cases, some or all of the components of hardware platform 600 may be virtualized, in particular the processor (s) and memory. For example, a virtualized environment may run on OS 606, or OS 606 could be replaced with a hypervisor or virtual machine manager. In this configuration, a virtual machine running on hardware platform 600 may virtualize workloads. A virtual machine in this configuration may perform essentially all of the functions of a physical hardware platform.

In a general sense, any suitably-configured processor can execute any type of instructions associated with the data to achieve the operations illustrated in this specification. Any of the processors or cores disclosed herein could transform an element or an article (for example, data) from one state or thing to another state or thing. In another example, some activities outlined herein may be implemented with fixed logic or programmable logic (for example, software and/or computer instructions executed by a processor).

Various components of the system depicted in FIG. 6 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, and similar. These mobile devices may be provided with SoC architectures in at least some embodiments. An example of such an embodiment is provided in FIG. 7. Such an SoC (and any other hardware platform disclosed herein) may include analog, digital, and/or mixed-signal, radio frequency (RF), or similar processing elements. Other embodiments may include a multichip module (MCM), with a plurality of chips located within a single electronic package and configured to interact closely with each other through the electronic package. In various other embodiments, the computing functionalities disclosed herein may be implemented in one or more silicon cores in application-specific integrated circuits (ASICs), FPGAs, and other semiconductor chips.

Figure 7:
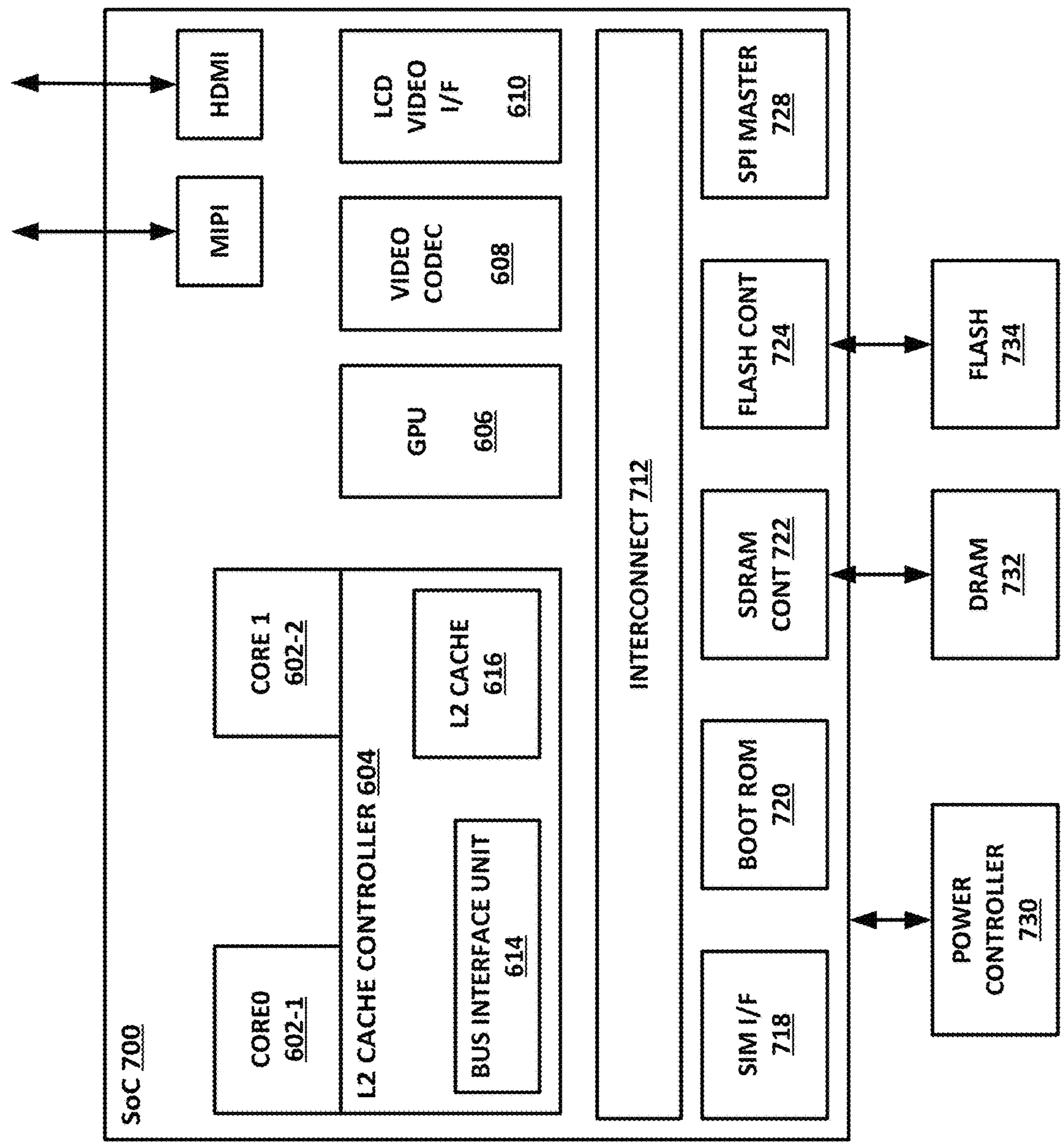
FIG. 7 is a block diagram of selected elements of a system-on-a-chip (SoC).

FIG. 7 is a block illustrating selected elements of an example SoC 700. Embodiments of SoC 700 may be configured or adapted to provide a cloud-based shared security cache as disclosed in the present specification.

At least some of the teachings of the present specification may be embodied on an SoC 700, or may be paired with an SoC 700. SoC 700 may include, or may be paired with, an advanced reduced instruction set computer machine (ARM) component. For example, SoC 700 may include or be paired with any ARM core, such as A-9, A-15, or similar. This architecture represents a hardware platform that may be useful in devices such as tablets and smartphones, by way of illustrative example, including Android phones or tablets, iPhone (of any version), iPad, Google Nexus, Microsoft Surface. SoC 700 could also be integrated into, for example, a PC, server, video processing components, laptop computer, notebook computer, netbook, or touch-enabled device.

As with hardware platform 600 above, SoC 700 may include multiple cores 702*a* and 702*b*. In this illustrative example, SoC 700 also includes an L2 cache control 704, a GPU 706, a video codec 708, a liquid crystal display (LCD) I/F 710 and an interconnect 712. L2 cache control 704 can include a bus interface unit 714, a L2 cache 716. Liquid crystal display (LCD) I/F 710 may be associated with mobile industry processor interface (MIPI)/HDMI links that couple to an LCD.

SoC 700 may also include a subscriber identity module (SIM) I/F 718, a boot ROM 720, a synchronous dynamic random access memory (SDRAM) controller 722, a flash controller 724, a serial peripheral interface (SPI) master 728, a suitable power control 730, a dynamic RAM (DRAM) 732, and flash 734. In addition, one or more embodiments include one or more communication capabilities, interfaces, and features such as instances of Bluetooth™ 736, a 3G modem 738, a global positioning system (GPS) 740, and an 802.11 Wi-Fi 742.

Designers of integrated circuits such as SoC 700 (or other integrated circuits) may use intellectual property (IP) blocks to simplify system design. An IP block is a modular, self-contained hardware block that can be easily integrated into the design. Because the IP block is modular and self-contained, the integrated circuit (IC) designer need only "drop in" the IP block to use the functionality of the IP block. The system designer can then make the appropriate connections to inputs and outputs.

IP blocks are often "black boxes." In other words, the system integrator using the IP block may not know, and need not know, the specific implementation details of the IP block. Indeed, IP blocks may be provided as proprietary third-party units, with no insight into the design of the IP block by the system integrator.

For example, a system integrator designing an SoC for a smart phone may use IP blocks in addition to the processor core, such as a memory controller, a nonvolatile memory (NVM) controller, Wi-Fi, Bluetooth, GPS, a fourth or fifth-generation network (4G or 5G), an audio processor, a video processor, an image processor, a graphics engine, a GPU engine, a security controller, and many other IP blocks. In many cases, each of these IP blocks has its own embedded microcontroller.

FIG. 8 is a block diagram illustrating selected elements of a processor 800. Embodiments of processor 800 may be configured or adapted to provide a cloud-based shared security cache as disclosed in the present specification.

In various examples, and throughout this specification and the appended claims, a "processor" may include any combination of logic elements operable to execute instructions, whether loaded from memory, or implemented directly in hardware, including, by way of nonlimiting example, a microprocessor, microcontroller, CPU, advanced RISC (reduced instruction set computing) machine (ARM), digital signal processor (DSP), FPGA, GPU, programmable logic array, ASIC, or virtual machine processor. In certain architectures, a multi-core processor may be provided, having for example, 2, 4, 8, 12, 16, 24, 32, 64, or 128 cores. In some embodiments, one or more co-processors or accelerators (hardware or software) may also be provided for specialized or support functions. In general, processor 800 may include any number of processing elements, which may be symmetrical or asymmetrical.

Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core may refer to logic located on an integrated circuit capable of maintaining an independent architectural state, wherein each independently maintained architectural state is associated with at least some dedicated execution resources. A hardware thread may refer to any logic located on an integrated circuit capable of maintaining an independent architectural state, wherein the independently maintained architectural states share access to execution resources. A physical CPU may include any suitable number of cores. In various embodiments, cores may include one or more out-of-order processor cores or one or more in-order processor cores. However, cores may be individually selected from any type of core, such as a native core, a software managed core, a core adapted to execute a native instruction set architecture (ISA), a core adapted to execute a translated ISA, a co-designed core, or other known core. In a heterogeneous core environment (i.e. asymmetric cores), some form of translation, such as binary translation, may be utilized to schedule or execute code on one or both cores.

Processor 800 includes one or more processor cores 802, including core 802-1-802-N. Cores 802 may be, as appropriate, single-thread cores or multi-thread cores. In multi-threaded cores, more than one hardware thread may be provided at a time, and the core may therefore provide more than one logical core per physical core. The cores may be configured to execute instruction code. Each processor 800 may include at least one shared cache 830, which may be treated logically as part of memory 840. Caches 830 may be filled according to known caching techniques, and may store instructions and/or data that may be used by one or more components of processor 800.

Processor 800 may include an integrated memory controller (MC) 834, to communicate with memory 840. Memory controller 834 may include logic and circuitry to interface with memory 840, and may also include a cache controller to handle filling and evicting instructions and data to and from cache 830.

By way of example, each core 802 may include front-end logic 806, execution logic 814, and backend logic 818.

In the illustrated embodiment, front-end logic 806 includes an instruction decoder or decoders 808, register renaming logic 810, and scheduling logic 812. Decoder 808 may decode instructions received. Register renaming logic 810 may provide register renaming, for example to facilitate pipelining. Scheduling logic 812 may schedule instruction execution, and may provide out-of-order (OOO) execution. Front-end logic 806 may fetch incoming instructions, perform various processing (e.g., caching, decoding, branch predicting, etc.), and pass instructions to execution logic 814.

Execution logic 814 includes one or more execution units 816-1-816-N. Execution units 816 may include hardware instructions and microcode to carry out the provided instructions.

Backend logic 818 includes retirement logic 820. Core 802 may provide for speculative execution of instructions, branch prediction, and similar. Retirement logic 820 may be configured to determine which predicted instructions were actually needed by the program flow.

Processor 800 may also include a PtP controller 832, which enables connection to an uncore, chipset, Northbridge, Southbridge, or bus, by way of example.

Figure 9:
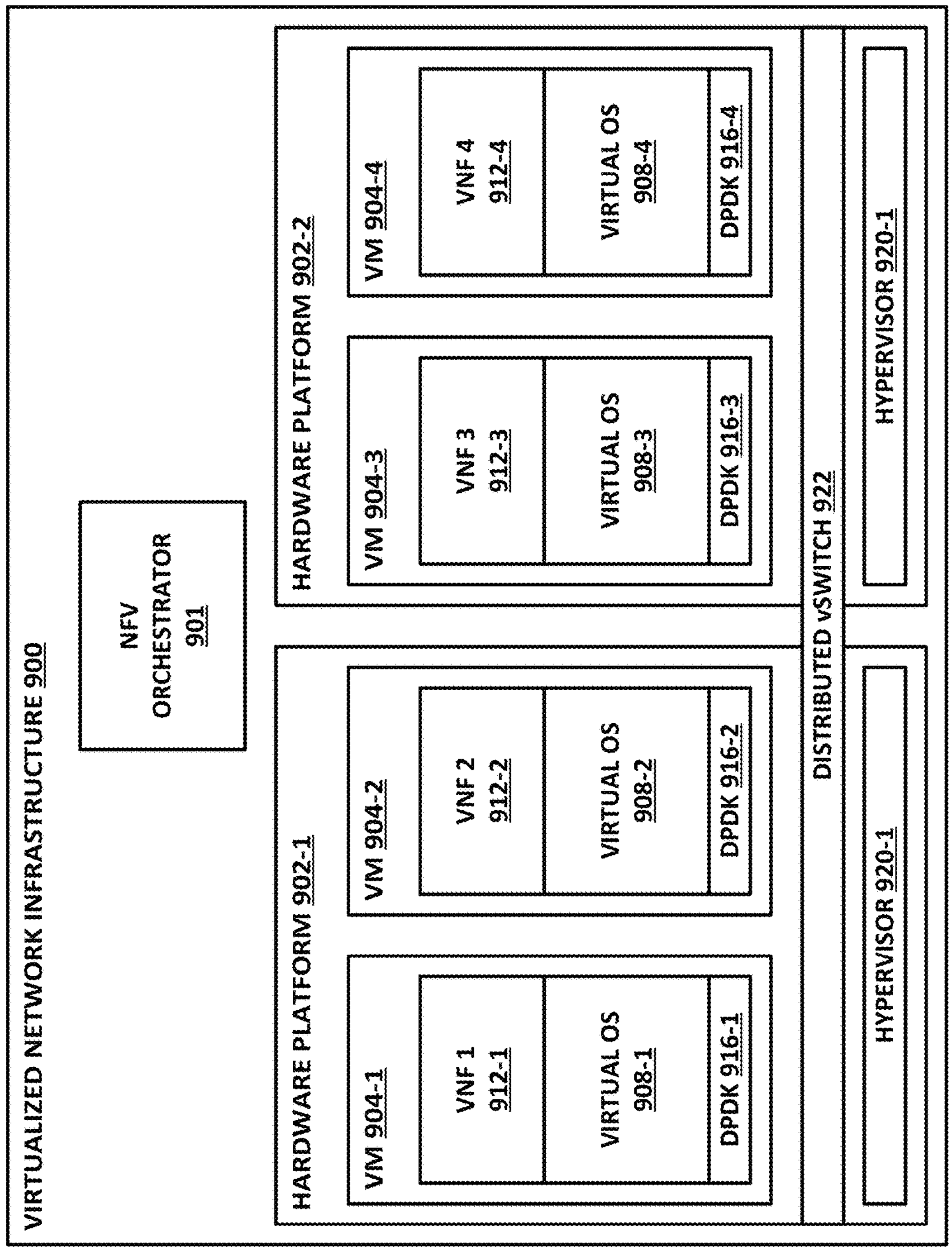
FIG. 9 is a block diagram of selected elements of a network function virtualization (NFV) infrastructure.

FIG. 9 is a block diagram of a network function virtualization (NFV) infrastructure 900. Embodiments of NFV infrastructure 900 may be configured or adapted to provide a cloud-based shared security cache as disclosed in the present specification.

NFV is an aspect of network virtualization that is generally considered distinct from, but that can still interoperate with, SDN. For example, virtual network functions (VNFs) may operate within the data plane of an SDN deployment. NFV was originally envisioned as a method for providing reduced capital expenditure (Capex) and operating expenses (Opex) for telecommunication services. One feature of NFV is replacing proprietary, special-purpose hardware appliances with virtual appliances running on commercial off-the-shelf (COTS) hardware within a virtualized environment. In addition to Capex and Opex savings, NFV provides a more agile and adaptable network. As network loads change, VNFs can be provisioned ("spun up") or removed ("spun down") to meet network demands. For example, in times of high load, more load balancing VNFs may be spun up to distribute traffic to more workload servers (which may themselves be virtual machines). In times when more suspicious traffic is experienced, additional firewalls or deep packet inspection (DPI) appliances may be needed.

Because NFV started out as a telecommunications feature, many NFV instances are focused on telecommunications. However, NFV is not limited to telecommunication services. In a broad sense, NFV includes one or more VNFs running within a network function virtualization infrastructure (NFVI), such as NFVI 400. Often, the VNFs are inline service functions that are separate from workload servers or other nodes. These VNFs can be chained together into a service chain, which may be defined by a virtual subnetwork, and which may include a serial string of network services that provide behind-the-scenes work, such as security, logging, billing, and similar.

In the example of FIG. 9, an NFV orchestrator 901 manages a number of the VNFs 912 running on an NFVI 900. NFV requires nontrivial resource management, such as allocating a very large pool of compute resources among appropriate numbers of instances of each VNF, managing connections between VNFs, determining how many instances of each VNF to allocate, and managing memory, storage, and network connections. This may require complex software management, thus making NFV orchestrator 901 a valuable system resource. Note that NFV orchestrator 901 may provide a browser-based or graphical configuration interface, and in some embodiments may be integrated with SDN orchestration functions.

Note that NFV orchestrator 901 itself may be virtualized (rather than a special-purpose hardware appliance). NFV orchestrator 901 may be integrated within an existing SDN system, wherein an operations support system (OSS) manages the SDN. This may interact with cloud resource management systems (e.g., OpenStack) to provide NFV orchestration. An NFVI 900 may include the hardware, software, and other infrastructure to enable VNFs to run. This may include a hardware platform 902 on which one or more VMs 904 may run. For example, hardware platform 902-1 in this example runs VMs 904-1 and 904-2. Hardware platform 902-2 runs VMs 904-3 and 904-4. Each hardware platform may include a hypervisor 920, virtual machine manager (VMM), or similar function, which may include and run on a native (bare metal) operating system, which may be minimal so as to consume very few resources.

Hardware platforms 902 may be or comprise a rack or several racks of blade or slot servers (including, e.g., processors, memory, and storage), one or more data centers, other hardware resources distributed across one or more geographic locations, hardware switches, or network interfaces. An NFVI 900 may also include the software architecture that enables hypervisors to run and be managed by NFV orchestrator 901.

Running on NFVI 900 are a number of VMs 904, each of which in this example is a VNF providing a virtual service appliance. Each VM 904 in this example includes an instance of the Data Plane Development Kit (DPDK), a virtual operating system 908, and an application providing the VNF 912.

Virtualized network functions could include, as nonlimiting and illustrative examples, firewalls, intrusion detection systems, load balancers, routers, session border controllers, DPI services, network address translation (NAT) modules, or call security association.

The illustration of FIG. 9 shows that a number of VNFs 904 have been provisioned and exist within NFVI 900. This FIGURE does not necessarily illustrate any relationship between the VNFs and the larger network, or the packet flows that NFVI 900 may employ.

The illustrated DPDK instances 916 provide a set of highly-optimized libraries for communicating across a virtual switch (vSwitch) 922. Like VMs 904, vSwitch 922 is provisioned and allocated by a hypervisor 920. The hypervisor uses a network interface to connect the hardware platform to the data center fabric (e.g., an HFI). This HFI may be shared by all VMs 904 running on a hardware platform 902. Thus, a vSwitch may be allocated to switch traffic between VMs 904. The vSwitch may be a pure software vSwitch (e.g., a shared memory vSwitch), which may be optimized so that data are not moved between memory locations, but rather, the data may stay in one place, and pointers may be passed between VMs 904 to simulate data moving between ingress and egress ports of the vSwitch. The vSwitch may also include a hardware driver (e.g., a hardware network interface IP block that switches traffic, but that connects to virtual ports rather than physical ports). In this illustration, a distributed vSwitch 922 is illustrated, wherein vSwitch 922 is shared between two or more physical hardware platforms 902.

The foregoing outlines features of several embodiments so that those skilled in the art may better understand various aspects of the present disclosure. The embodiments disclosed can readily be used as the basis for designing or modifying other processes and structures to carry out the teachings of the present specification. Any equivalent constructions to those disclosed do not depart from the spirit and scope of the present disclosure. Design considerations may results in substitute arrangements, design choices, device possibilities, hardware configurations, software implementations, and equipment options.

In certain embodiments, some of the components illustrated herein may be omitted or consolidated. In a general sense, the arrangements depicted in the FIGURES may be more logical in their representations, whereas a physical architecture may include various permutations, combinations, and/or hybrids of these elements.

With the numerous examples provided herein, interaction may be described in terms of two, three, four, or more electrical components. These descriptions are provided for purposes of clarity and example only. Any of the illustrated components, modules, and elements of the FIGURES may be combined in various configurations, all of which fall within the scope of this specification.

In certain cases, it may be easier to describe one or more functionalities by disclosing only selected element. Such elements are selected to illustrate specific information to facilitate the description. The inclusion of an element in the FIGURES is not intended to imply that the element must appear in the disclosure, as claimed, and the exclusion of certain elements from the FIGURES is not intended to imply that the element is to be excluded from the disclosure as claimed. Similarly, any methods or flows illustrated herein are provided by way of illustration only. Inclusion or exclusion of operations in such methods or flows should be understood the same as inclusion or exclusion of other elements as described in this paragraph. Where operations are illustrated in a particular order, the order is a nonlimiting example only. Unless expressly specified, the order of operations may be altered to suit a particular embodiment.

Other changes, substitutions, variations, alterations, and modifications will be apparent to those skilled in the art. All such changes, substitutions, variations, alterations, and modifications fall within the scope of this specification.

In order to aid the United States Patent and Trademark Office (USPTO) and, any readers of any patent or publication flowing from this specification, the Applicant: (a) does not intend any of the appended claims to invoke paragraph (f) of 35 U.S.C. section 112, or its equivalent, as it exists on the date of the filing hereof unless the words "means for" or "steps for" are specifically used in the particular claims; and (b) does not intend, by any statement in the specification, to limit this disclosure in any way that is not otherwise expressly reflected in the appended claims, as originally presented or as amended.

EXAMPLE IMPLEMENTATIONS

There is disclosed in one example, a computing apparatus, comprising: a processor and a memory; a network interface; and a security agent comprising instructions encoded within the memory to instruct the processor to: identify an unknown software object; query, via the network interface, a global reputation store for a global reputation for the unknown software object; receive a response from the global reputation store and determine that the unknown software object does not have a reliable global reputation; compute a local reputation for the unknown software object; and share the local reputation for the unknown software object with the global security cache.

There is further disclosed an example computing apparatus, wherein sharing the local reputation for the unknown software object comprises uploading a hash of the unknown software object.

There is further disclosed an example computing apparatus, wherein sharing the local reputation for the unknown software object comprises uploading metadata about the unknown software object.

There is further disclosed an example computing apparatus, wherein the metadata comprise multi-dimensional metadata.

There is further disclosed an example computing apparatus, wherein computing a local reputation for the unknown software object comprises performing local sandbox analysis on the unknown software object.

There is further disclosed an example computing apparatus, wherein computing a local reputation for the unknown software object comprises performing local deep static analysis on the unknown software object.

There is further disclosed an example computing apparatus, wherein computing a local reputation for the unknown software object comprises performing local behavioral analysis on the unknown software object.

There is further disclosed an example computing apparatus, wherein computing a local reputation for the unknown software object comprises performing local heuristic analysis of a user reaction to the unknown software object.

There is further disclosed an example computing apparatus, wherein the security agent further comprises instructions to receive from the global reputation store a not-reliable reputation based at least in part on analysis by other endpoints.

There is further disclosed an example computing apparatus, wherein the security agent further comprises instructions to act on the not-reliable reputation.

There is further disclosed an example computing apparatus, wherein the security agent further comprises instructions to assign a weight to the not-reliable reputation.

There is further disclosed an example computing apparatus, wherein assigning the weight comprises assessing a prevalence of the unknown software object.

There is further disclosed an example computing apparatus, wherein assigning the weight comprises assessing a type of analysis performed by one or more other endpoints to derive the not-reliable reputation.

There is further disclosed an example computing apparatus, wherein assigning the weight comprises assessing a time since last encounter for the unknown software object.

There is further disclosed an example computing apparatus, wherein assigning the weight comprises comparing an operating environment of one or more endpoints that contributed to the not-reliable reputation to an operating environment of the computing apparatus.

There is also disclosed an example of one or more tangible, non-transitory computer-readable storage mediums having stored thereon executable instructions to instruct a processor to: detect on a local host a security object, and determine that the security object does not have a locally-cached security reputation; query a non-local reputation store for a reliable reputation for the security object; receive from the non-local reputation store a response that the security object lacks a reliable reputation; analyze the security object to assign the security object a provisional local reputation; and upload the provisional local reputation to the non-local reputation store.

There is further disclosed an example of one or more tangible, non-transitory computer-readable mediums, wherein uploading the provisional local reputation comprises uploading a hash of the security object.

There is further disclosed an example of one or more tangible, non-transitory computer-readable mediums, wherein uploading the provisional local reputation comprises uploading metadata about the security object to the non-local reputation store.

There is further disclosed an example of one or more tangible, non-transitory computer-readable mediums, wherein the metadata comprise multi-dimensional metadata.

There is further disclosed an example of one or more tangible, non-transitory computer-readable mediums, wherein analyzing the security object comprises performing local sandbox analysis on the security object.

There is further disclosed an example of one or more tangible, non-transitory computer-readable mediums, wherein analyzing the security object comprises performing local deep static analysis on the security object.

There is further disclosed an example of one or more tangible, non-transitory computer-readable mediums, wherein analyzing the security object comprises performing local behavioral analysis on the security object.

There is further disclosed an example of one or more tangible, non-transitory computer-readable mediums, wherein analyzing the security object comprises performing local heuristic analysis of a user reaction to the security object.

There is further disclosed an example of one or more tangible, non-transitory computer-readable mediums, wherein instructions are further to receive from the non-local reputation store a not-reliable reputation based at least in part on analysis by other endpoints.

There is further disclosed an example of one or more tangible, non-transitory computer-readable mediums, wherein the instructions are further to act on the not-reliable reputation.

There is further disclosed an example of one or more tangible, non-transitory computer-readable mediums, wherein the instructions are further to assign a weight to the not-reliable reputation.

There is further disclosed an example of one or more tangible, non-transitory computer-readable mediums, wherein assigning the weight comprises assessing a prevalence of the security object.

There is further disclosed an example of one or more tangible, non-transitory computer-readable mediums, wherein assigning the weight comprises assessing a type of analysis performed by one or more other endpoints to derive the not-reliable reputation.

There is further disclosed an example of one or more tangible, non-transitory computer-readable mediums, wherein assigning the weight comprises assessing a time since last encounter for the security object.

There is further disclosed an example of one or more tangible, non-transitory computer-readable mediums, wherein assigning the weight comprises comparing an operating environment of one or more endpoints that contributed to the not-reliable reputation to an operating environment of a local host.

There is also disclosed an example computer-implemented method of providing globally cached reputations for unknown security objects, comprising: performing a first identification of a security object; determining that the security object is not permitted to operate on a local host without a sufficiently-positive reputation; querying a non-local security repository for a global reputation for the security object; determining that the non-local security repository has not assigned the security object a global reputation; locally analyzing the security object to assign the security object a provisional reputation; and uploading the provisional reputation to the non-local security repository.

There is further disclosed an example method, wherein uploading the provisional reputation comprises uploading a hash of the security object.

There is further disclosed an example method, wherein uploading the provisional reputation comprises uploading metadata about the security object to the non-local security repository.

There is further disclosed an example method, wherein the metadata comprise multi-dimensional metadata.

There is further disclosed an example method, wherein locally analyzing the security object comprises performing local sandbox analysis on the security object.

There is further disclosed an example method, wherein locally analyzing the security object comprises performing local deep static analysis on the security object.

There is further disclosed an example method, wherein locally analyzing the security object comprises performing local behavioral analysis on the security object.

There is further disclosed an example method, wherein locally analyzing the security object comprises performing local heuristic analysis of a user reaction to the security object.

There is further disclosed an example method, further comprising receiving from the non-local security repository a not-reliable reputation based at least in part on analysis by other endpoints.

There is further disclosed an example method, further comprising acting on the not-reliable reputation.

There is further disclosed an example method, further comprising assigning a weight to the not-reliable reputation.

There is further disclosed an example method, wherein assigning the weight comprises assessing a prevalence of the security object.

There is further disclosed an example method, wherein assigning the weight comprises assessing a type of analysis performed by one or more other endpoints to derive the not-reliable reputation.

There is further disclosed an example method, wherein assigning the weight comprises assessing a time since last encounter for the security object.

There is further disclosed an example method, wherein assigning the weight comprises comparing an operating environment of one or more endpoints that contributed to the not-reliable reputation to an operating environment of a local host.

There is also disclosed an example apparatus comprising means for performing the method of a number of the above examples.

There is further disclosed an example apparatus, wherein the means for performing the method comprise a processor and a memory.

There is further disclosed an example apparatus, wherein the memory comprises machine-readable instructions, that when executed cause the apparatus to perform the method of a number of the above examples.

There is further disclosed an example apparatus, wherein the apparatus is a computing system.

There is also disclosed an example of at least one computer-readable medium comprising instructions that, when executed, implement a method or realize an apparatus as illustrated in a number of the above examples.

What is claimed is:

1. A computing apparatus, the computing apparatus being an endpoint device, and comprising:
   a processor circuit and a memory;
   a network interface; and
   a security agent comprising instructions encoded within the memory to instruct the processor circuit to:
      identify an unknown software object on the endpoint device;
      query, via the network interface, a global reputation store for a global reputation for the unknown software object;
      receive a response from the global reputation store and determine that the unknown software object has a reputation previously assigned by a different endpoint, but does not have a reliable global reputation;
      compute, on the endpoint device, a local reputation for the unknown software object; and
      based at least in part on the determination that the unknown software object does not have a reliable global reputation, share the local reputation for the unknown software object with the global security cache.

2. The computing apparatus of claim 1, wherein sharing the local reputation for the unknown software object comprises uploading a hash of the unknown software object.

3. The computing apparatus of claim 1, wherein sharing the local reputation for the unknown software object comprises uploading metadata about the unknown software object.

4. The computing apparatus of claim 3, wherein the metadata comprise multi-dimensional metadata.

5. The computing apparatus of claim 1, wherein computing a local reputation for the unknown software object comprises performing local sandbox analysis on the unknown software object.

6. The computing apparatus of claim 1, wherein computing a local reputation for the unknown software object comprises performing local deep static analysis on the unknown software object.

7. The computing apparatus of claim 1, wherein computing a local reputation for the unknown software object comprises performing local behavioral analysis on the unknown software object.

8. The computing apparatus of claim 1, wherein computing a local reputation for the unknown software object comprises performing local heuristic analysis of a user reaction to the unknown software object.

9. The computing apparatus of claim 1, wherein the security agent further comprises instructions to receive from the global reputation store a not-reliable reputation based at least in part on analysis by other endpoints.

10. The computing apparatus of claim 9, wherein the security agent further comprises instructions to assign a weight to the not-reliable reputation.

11. One or more tangible, non-transitory computer-readable storage mediums having stored thereon executable instructions to instruct a processor to:
   detect on an endpoint device a security object, and determine that the security object does not have a locally-cached security reputation;
   query a non-local reputation store for a reliable reputation for the security object;
   receive from the non-local reputation store a response that the security object has a reputation previously assigned by a different endpoint, but lacks a reliable reputation;
   analyze the security object to assign the security object a provisional local reputation; and
   based at least in part on the response that the security object lacks a reliable reputation, upload the provisional local reputation to the non-local reputation store.

12. The one or more tangible, non-transitory computer-readable mediums of claim 11, wherein instructions are further to receive from the non-local reputation store a not-reliable reputation based at least in part on analysis by other endpoints.

13. The one or more tangible, non-transitory computer-readable mediums of claim 12, wherein the instructions are further to act on the not-reliable reputation.

14. The one or more tangible, non-transitory computer-readable mediums of claim 12, wherein the instructions are further to assign a weight to the not- reliable reputation.

15. The one or more tangible, non-transitory computer-readable mediums of claim 14, wherein assigning the weight comprises assessing a prevalence of the security object.

16. The one or more tangible, non-transitory computer-readable mediums of claim 14, wherein assigning the weight comprises assessing a type of analysis performed by one or more other endpoints to derive the not-reliable reputation.

17. The one or more tangible, non-transitory computer-readable mediums of claim 14, wherein assigning the weight comprises assessing a time since last encounter for the security object.

18. The one or more tangible, non-transitory computer-readable mediums of claim 14, wherein assigning the weight comprises comparing an operating environment of one or more endpoints that contributed to the not-reliable reputation to an operating environment of a local host.

19. A computer-implemented method of providing globally cached reputations for unknown security objects on an endpoint device, comprising:

performing, on the endpoint, a first identification of a security object;

determining that the security object is not permitted to operate on the endpoint without a sufficiently-positive reputation;

querying a non-local security repository for a global reputation for the security object;

determining that a different endpoint has assigned the object a reputation but that the non-local security repository has not assigned the security object a reliable global reputation;

locally analyzing the security object on the endpoint device to assign the security object a provisional reputation; and based at least in part upon the determination that the non-local security repository has not assigned the security object a global reputation, uploading the provisional reputation to the non-local security repository.

20. The method of claim 19, wherein uploading the provisional reputation comprises uploading a hash of the security object.

* * * * *